G. VAN TASSEL.
SAFETY STEERING MECHANISM.
APPLICATION FILED FEB. 28, 1918.
1,269,136.
Patented June 11, 1918.
2 SHEETS—SHEET 1.
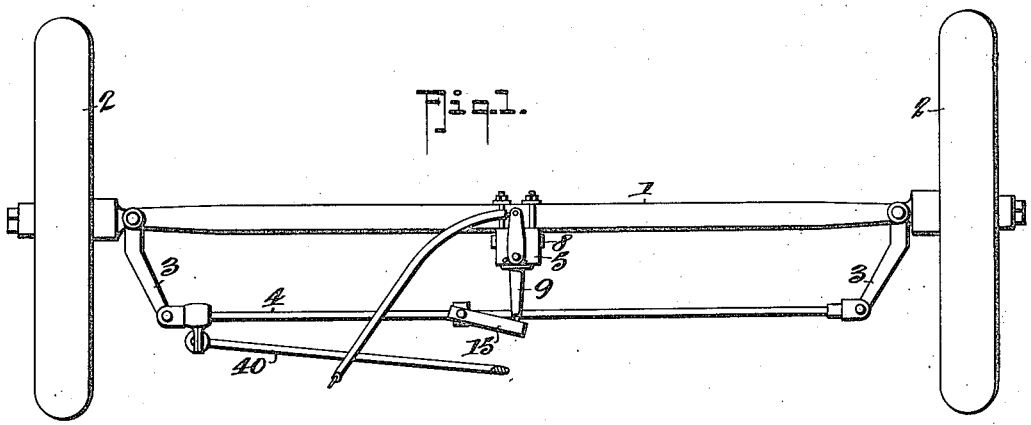
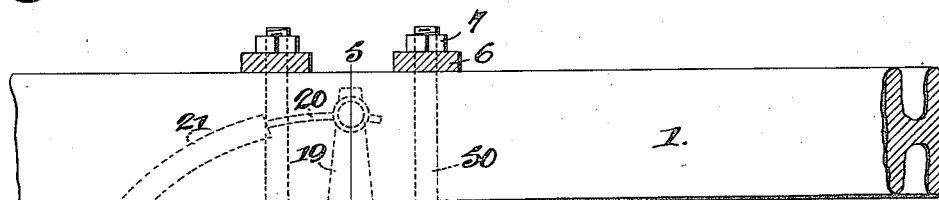
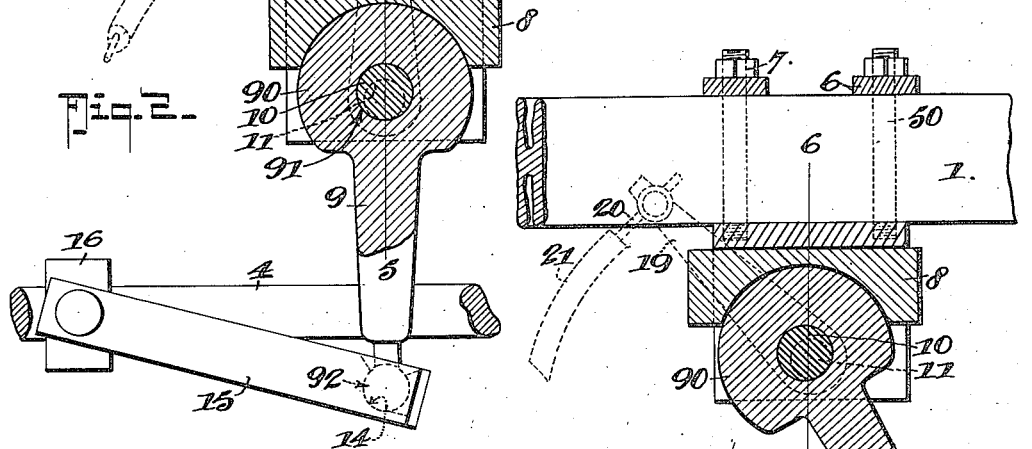
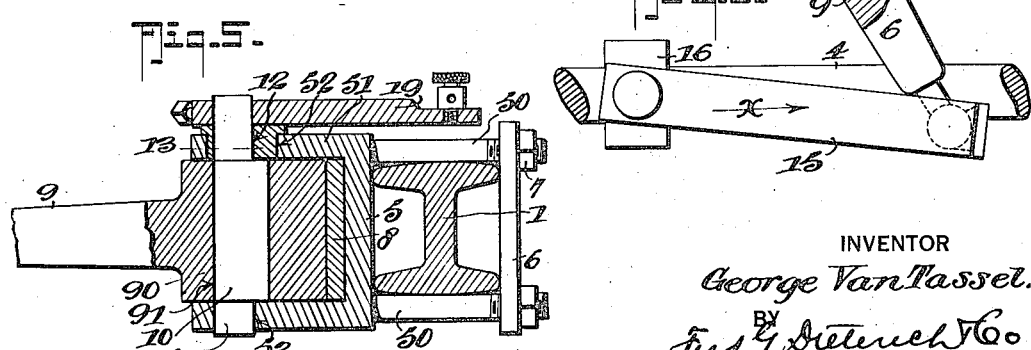
INVENTOR
George Van Tassel.
BY
Fred J. Dieterich & Co.
ATTORNEYS G. VAN TASSEL.
SAFETY STEERING MECHANISM.
APPLICATION FILED FEB. 28, 1918.
1,269,136.
Patented June 11, 1918.
2 SHEETS—SHEET 2.
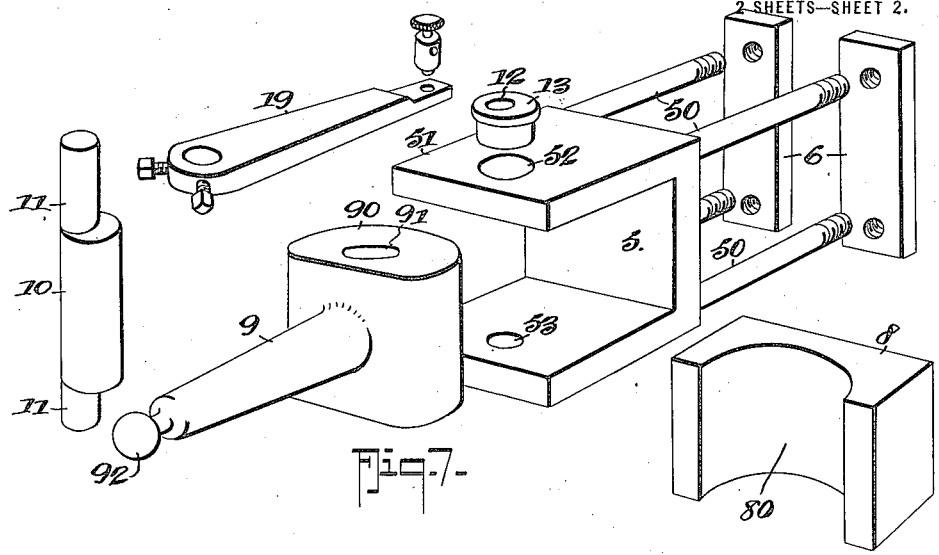
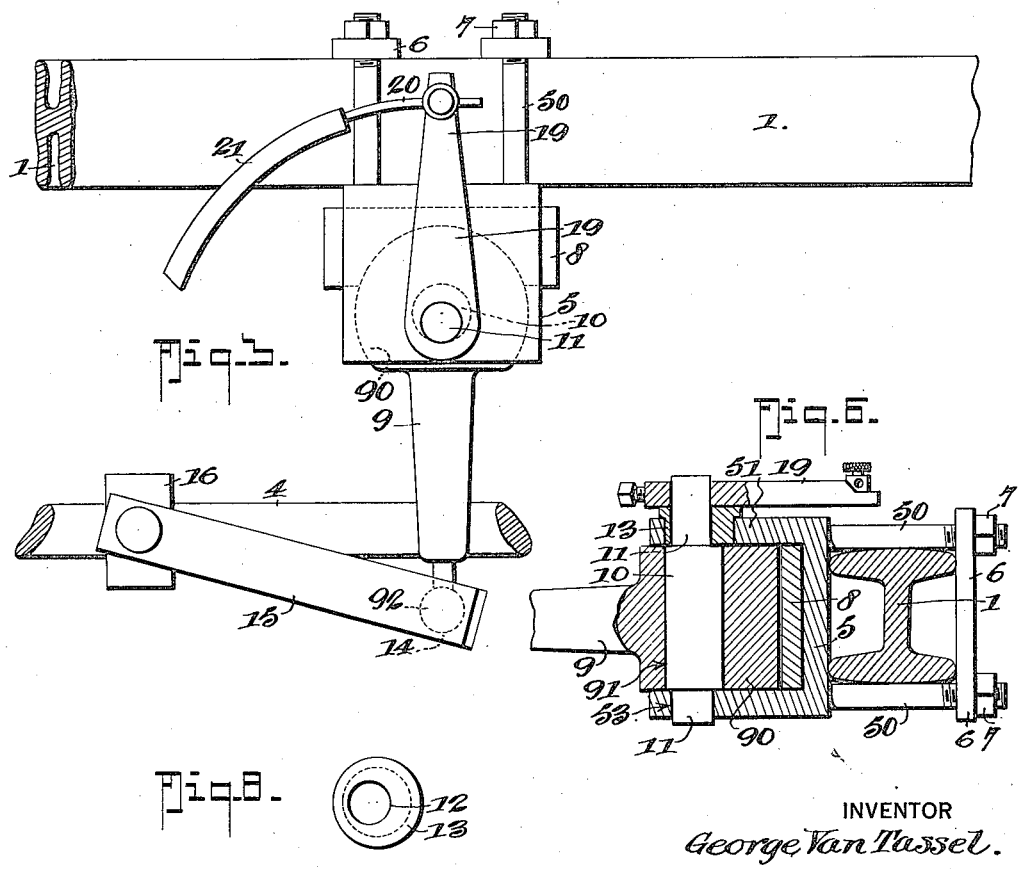
INVENTOR
George Van Tassel.
BY
Fred G. Dieterich & Co.
ATTORNEYS

UNITED STATES PATENT OFFICE.

GEORGE VAN TASSEL, OF CEDAR RAPIDS, IOWA.

SAFETY STEERING MECHANISM.

1,269,136.

Specification of Letters Patent.   Patented June 11, 1918.

Application filed February 28, 1918. Serial No. 219,644.

*To all whom it may concern:*

Be it known that I, GEORGE VAN TASSEL, a citizen of the United States, residing at Cedar Rapids, in the county of Linn and State of Iowa, have invented a new and Improved Safety Steering Mechanism, of which the following is a specification.

This invention has reference to improvements in motor vehicles steering mechanism and more particularly has for its purpose to provide certain safety attachments applicable to the front axle of any automobile and adapted to connect with the reach rod for causing a locking effect on the front wheels, when they are in straight ahead alinement with the back wheels and which may be conveniently adjusted for releasing the locked condition of the said front wheels, when turning a corner or around a curve.

Among other objects, my invention seeks to provide locking attachments for the general purpose stated, of a simple and inexpensive construction, that constitutes a safety device especially useful on cars not having irreversible steering gears, such as the Ford, Reo, &c., and which serves as an added comfort in steering, when applied to any car.

Again, my invention seeks to provide a locking attachment connectible with the axle and the reach rods of automobiles in which the locking elements are especially designed for effecting a maximum frictional locking engagement of the parts, when the front wheels are straight ahead and the devices are at the centered position, and gradually releasing, when adjusted to either side of the center, and fully releasing, when thrown far enough for the car to turn corners or turn around.

With the above objects in view, my invention consists in the peculiar combination and novel arrangement of the parts to be hereinafter fully explained, specifically pointed out in the appended claims and illustrated in the accompanying drawings, in which:

Figure 1 is a diagrammatic plan view of a conventional type of front axle and a reach rod connection with my invention applied, the front wheels being shown as held locked in the straight ahead position.

Fig. 2 is a plan view of a portion of the front axle and the reach rod with my improved locking attachment applied, the latter being shown in horizontal section and the brake devices as set at the maximum frictionally locked engagement.

Fig. 3 is a plan view of the parts shown in Fig. 2.

Fig. 4 is a view similar to Fig. 2, the eccentric axle or stud being shown at the shifted or released position under the pull action of the pull rod, see dotted lines, and the eccentric or brake bar shown as shifted to the release position by the reach rod movement, see arrow $x$.

Fig. 5 is a longitudinal section taken practically on the line 5—5 on Fig. 2.

Fig. 6 is a similar view on the line 6—6 on Fig. 4.

Fig. 7 is a perspective view of the several parts that constitute my safety attachment, the said parts being shown separated.

Fig. 8 is a plan view of the bushing hereinafter referred to.

In the practical application of my improved safety attachment, the same is applied to the convenient type of front axle and reach bar in the manner shown in Figs. 1, 2, 3, 5 and 6, in which 1 designates the axle, 2—2 the front wheels with which connect the steering cranks 3—3, in turn coupled up by the reach bar 4 to which the steering gear rod 40 joins in the usual manner.

My attachment, in the preferred construction shown, includes a U-shape frame 5 from the rear face of which project four corner bolts 50 that straddle the axle 1 and to which they are securely clipped, by the clip bars 6—6, and the clamp nuts 7—7, as shown.

At the front end, the upper member 51 of the frame 5 has a large circular aperture 52 that positions vertically over the similar aperture 53 in the lower frame member, which aperture is, however, of less diameter than the aperture 52 and is eccentric through the said aperture 52, as is clearly shown in Figs. 2, 3 and 5.

8 designates a brake shoe and 9 a brake arm, the latter including a substantially semi-circular head 90 for coöperating with a like shaped brake seat 80 in the shoe.

The brake head 90 has a central rounded aperture 91 of a diameter slightly less than that of the aperture 52 in the top frame member 51.

10 designates a stud pivot that fits the aperture 91 in the brake head 90 and the said pivot includes upper and lower eccentric spindles 11—11, the lower one of which has bearing in the aperture 53 of the lower frame member and the upper one of which has bearing in the eccentric aperture 12 in a plug 13 that fits the aperture 52.

The object in making the aperture 52 of greater diameter than the stud pivot is to provide for readily slipping the said stud pivot into the desired operative connection with the brake head and the frame 5, the plug 13 with the aperture 12 providing for the desired pivotal bearing for the upper end of the said stud 10, as shown.

The outer end of the brake arm 9 carries a ball head 92 for engaging a ball socket 14 in the outer end of a link member 15 that pivotally connects with a clamp block 16 adjustable along the reach bar, it being understood that the said connection and the ball and socket bearing that join the brake arm and the link provides for freely swinging the brake arm on its axial or pivotal connection with the frame 5, when the reach bar is shifted in either direction through the proper adjustment of the steering rod.

A crank lever 19 is connected to the upper end of the upper eccentric spindle 11 on the stud pivot 10 and the said lever is adapted to be controlled from the dash or steering column by a wire pull 20 that runs through a flexible tube 21.

If desired, the lever 19 may be adjusted and locked by other means than those operated from the dash.

From the foregoing taken in connection with the drawings, the complete construction, the practical application of and the manner in which my safety device is adapted to be operated will be readily apparent.

It will be noticed, since the brake shoe is free to move laterally between the back of the U-shape frame 5 and the head of the brake arm, permits the shoe to travel back and forth with the moving brake head and further, since the said head is eccentrically pivoted in the manner shown and described, it follows that, when the brake is adjusted to the straight ahead position, see Figs. 1, 2 and 3, the device is caused to apply the hardest braking effect, and thus through the connection with the reach rod tends to hold the said rod from accidental or a too free shiftable movement and thereby retains the wheels locked to the head or straightaway position.

When it is desired to apply the steering gear to turn the machine, the operator by first pulling on the wire or cord pull 20, in the direction of the arrow, causes the crank arm 19 to take the position shown in dotted lines on Fig. 4, and in doing so, shifts the stud pin to cause the brake head to pull away from a tight frictional contact with the locking or braking shoe, as in Fig. 4, thus leaving the brake bar and its head in position for being freely turned respectively to the brake block and the frame 5, for example to the direction indicated on Fig. 2, when the steering rod pulls the reach bar over in the direction of the arrow $x$, it being apparent that the correlation of the several frictionally engaging parts is such that the said lock device gradually releases, when the brake bar is swung to either side of the center and fully releases, when thrown far enough for the car to turn corners or to turn around, it being also understood the brake head located between the frame bearing and the bearings in the brake arm, which when operated by the control lever, increases or diminishes the resistance between the surfaces of the brake shoe, the frame 5 and the brake head.

The dash control allows instant adjustment or the cutting in or out of the device without leaving the seat but, without the said control, the adjusting is done on the device itself and the latter becomes a part of the steering gear of the car.

What I claim is:

1. The combination with the axle and the reach bar of the steering mechanism; of a lever pivotally mounted on the axle, a link connecting the lever and the reach rod, and friction brake elements connecting the lever and the axle for holding the reach rod locked, when the lever is at the midway position, and manually controlled means for shifting the friction brake elements to a releasing position to thereby permit the application of the steering gear.

2. The combination with the axle and the reach bar of the steering mechanism; of a lever pivotally mounted on the axle, a link connecting the lever and the reach rod, and friction brake elements connecting the lever and the axle for holding the reach rod locked, when the lever is at the midway position, and manually controlled means for shifting the friction brake elements to a releasing position, to thereby permit the application of the steering gear, the said elements including a bracket attached to the axle and having a friction face, a brake shoe frictionally engaging the said bracket, a lever having a brake head for coöperating with the brake shoe, the said brake head being pivoted on the bracket eccentrically with respect to the brake shoe, whereby a maximum frictional locking of the brake head and the brake shoe is attained, when the lever is at a midway position, and means for shifting the brake lever, whereby to gradually separate the friction faces of the brake head and the shoe to thereby permit of the application of the steering devices for turning the wheels.

3. A means for the purposes stated comprising in combination with the front axle and the reach bar of a steering mechanism that joins with the opposite front wheels, of a bracket frame having attached means for securing it to the front axle, a laterally movable brake shoe mounted in the bracket and having a substantial semi-cylindrical braking surface, the brake lever including a head having a substantially semi-cylindrical face for coengagement with the friction face of the shoe, a stud on which the brake head is pivoted, said stud including end spindles eccentric with respect to the axis of the brake head, a lever arm attached to one of the eccentric spindles, the said brake head including an arm, a link connecting the brake bar and the reach arm, a crank arm on the upper one of the eccentric pintles and a flexible connection for turning the said pintles for the brake head as set forth.

4. The combination with the front axle of a motor vehicle and the reach bar of the steering mechanism therefor; of a frictional brake device for holding the said bar from movement, when the front axle wheels are at the straight ahead position, the said brake device including a bracket having means for attaching it to the axle, said bracket having a friction surface, a brake shoe engaging said surface and having lateral movement relatively to such surface, the said shoe having a semi-cylindrical friction face, a brake arm including a head having a semi-cylindrical friction face for coengaging with the semi-cylindrical face of the brake shoe, means for eccentrically pivoting the said head, whereby, when the brake arm is at the midway position, the head and the shoe will be in a locked frictional engagement and, when the arm is turned either way from the midway position, the said head and the brake shoe friction faces separate, a link connection that joins the arm and the reach rod, the lever on the eccentric pivot of the head of the brake arm for turning the said arm to release its head from frictional engagement with the brake shoe to thereby permit the arm to move under the shifting action of the reach rod.

GEORGE VAN TASSEL.